Oct. 21, 1958     E. W. KOLLS     2,856,747

CUTTING BLADE FOR ROTARY TYPE MOWING MACHINES

Filed Sept. 30, 1955

Witness
Edward P. Seeley

Inventor
ERNEST W. KOLLS
by M. Talbert Dick
Attorney

United States Patent Office 2,856,747
Patented Oct. 21, 1958

2,856,747
CUTTING BLADE FOR ROTARY TYPE MOWING MACHINES

Ernest W. Kolls, Des Moines, Iowa

Application September 30, 1955, Serial No. 537,706

3 Claims. (Cl. 56—295)

This invention relates to the cutting means of mowing machines and more particularly to the horizontal blade of rotary type lawn mowers.

In recent years rotary lawn mowing machines have become most popular. In such machines the cutting blade is centrally secured to the prime mover and when operating the blade rotates in a horizontal plane. There are, however, at least two serious faults in this type of mower. The rigid cutting blade when accidentally striking uncuttable objects, such as rocks, stumps, fencing, cement walks, metal pieces and like, damages or breaks the shaft and/or bearings of the motor or engine. While the damage to the blade may well be of considerable moment, the repair and replacement of parts of the prime mover are of major expense. Also when the machine encounters tough going such as high thick weeds or grass, the motor often stalls, thereby necessitating the highly objectionable task of manually cranking the engine and restarting of the same.

Therefore, one of the principal objects of my invention is to provide a mower blade that will have a certain amount of flexibility when encountering uncuttable objects.

A further object of this invention is to provide a blade for mowing machines that is so constructed as to reduce the hazards of possible engine stalling when the blade encounters excessive cutting resistance.

A still further object of my invention is to provide a multi-part cutting blade that remains in balance when the prime mover is stopped.

A still further object of this invention is to provide a rotary mowing machine cutting blade of several parts that depends on both centrifugal force and friction joints to maintain its normal cutting attitude.

A still further object of this invention is to provide a mower blade having a central section, and two outer cutting sections pivoted thereto with each of the cutting sections of a length greater than that of the central section.

Still further objects of my invention are to provide a multi-part rotary blade for mowing machines that is economical in manufacture and durable in use.

These and other objects will be apparent to those skilled in the art.

Figure 1:
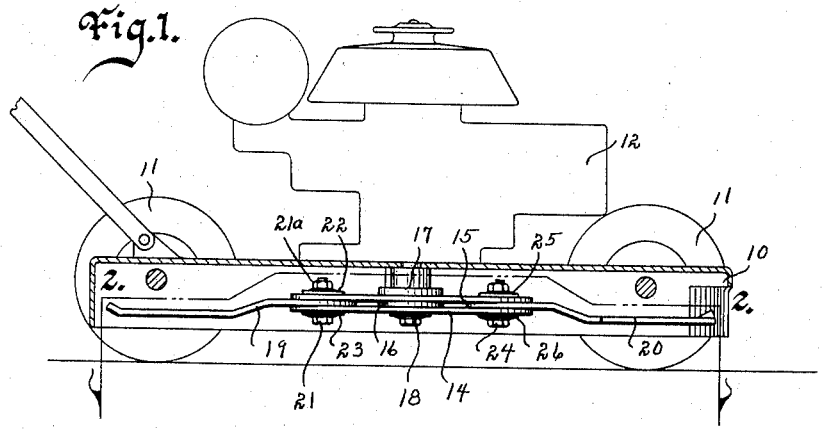
Figure 2:
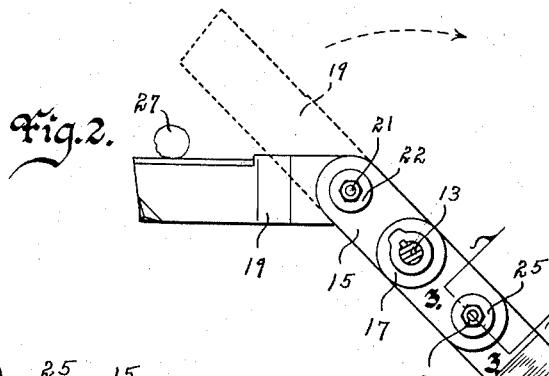
Figure 3:
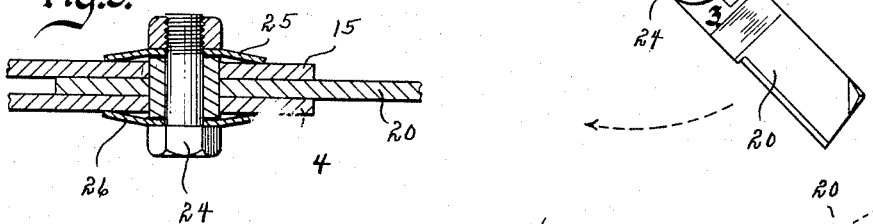
Figure 4:
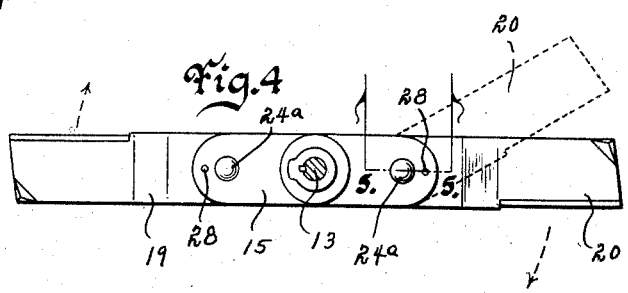
Figure 5:
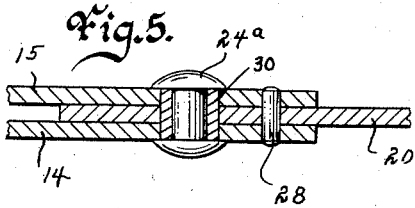

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a side view partly in section of a rotary lawn mower using my cutting blade, Fig. 2 is a top plan view of my blade taken on line 2—2 of Fig. 1, Fig. 3 is an enlarged sectional view of my cutting blade taken on line 3—3 of Fig. 2 and more fully illustrates its construction, Fig. 4 is a top plan view of a modified cutting blade structure, and Fig. 5 is a sectional view of the modified blade taken on line 5—5 of Fig. 4.

In the drawings I have used the numeral 10 to designate the chassis of an ordinary rotary type lawn mower and which is supported by the usual wheels 11. The numeral 12 designates the prime mover having the usual engine shaft 13. It is to such a machine that I secure my cutting blade and which I will now describe in detail.

The central portion of my blade comprises two short bars 14 and 15. These two parallel bars 14 and 15 are spaced apart by a spacing washer 16, as shown in Fig. 1. This central portion of my blade is secured to the prime mover shaft 13 by any suitable means such as the bearing 17 and nut 18. Between the two ends of the bars 14 and 15 extend the butt ends of the two cutting knife bars 19 and 20. The length of each of these cutting knives is greater in length than the lengths of the bars 14 and 15. Extending through the two adjacent ends of the members 14 and 15 and the rear end of the knife 19 is a bolt means 21. On the bolt means and between its nut 21a and the bar 15 is a cone spring washer 22. The numeral 23 designates a similar spring friction washer between the head of the bolt means 21 and the bar 14. The other knife 20 is held in an identical manner, i. e., by a bolt means 24 extending through the other two end portions of the bars 14 and 15 and the butt end of the blade 20. The numeral 25 designates a cup or cone resilient washer on the bolt means 24 and positioned between the nut of the bolt means and the bar 15. The numeral 26 designates a like cup washer on the bolt means 24 and positioned between its head and the bar 14. The structure of attaching the knives 19 and 20 is illustrated in Fig. 3. The cup or cone spring washers 22, 23, 25 and 26 act as resilient friction means for holding the cutting knives 19 and 20 against relative swinging movement to the central bars 14 and 15. However, if one of the cutting knives 19 or 20 were to strike an uncuttable object 27 or if the knives were to encounter excessive cutting resistance, such knife or knives could swing rearwardly as shown in Fig. 2 and pass the obstruction or excessive resistance. Having passed the object 27 by rearward swinging movement, the spinning of the blade will cause the knife or knives to again swing outwardly by centrifugal force and in parallel relationship with the central portion of the cutting blade. Obviously this centrifugal force holding the cutting knives radially outwardly will normally maintain them in cutting positions but the force is yieldable and when the knives engage sufficient resistance they will collapse rearwardly from the direction of rotation of the blade. By thus moving to the rear and past an uncuttable object shock will be relieved from the motor shaft 13. This will prevent serious damage to the motor shaft and bearings. This relief from serious strains on the motor and its shafts and bearings eliminates costly repairs. Also when the cutting blade encounters tough mowing such as heavy grass or tall weeds the cutting knives 19 and 20 can momentarily swing to an angle at the rear and with the resultant less resistance the motor will not stall. Furthermore, with the blades extending at an angle to the center of the blade, more of a shearing action will take place and the material will be cut somewhat more easily. With the forward speed of travel of the machine reduced, or less resistance to the cutting action, the elongated cutting knife bars 19 and 20 will return to radial cutting positions.

I have found that it is most important to have besides centrifugal force a friction or resilient means for maintaining the cutting knife bars 19 and 20 in parallel radially extending positions diametrically away from each other. In the drawings I use the friction washers 22, 23, 25 and 26. By this construction when the motor is turned off the cutting knife bars will remain in extended positions. Without this friction or resilient means I have found that when a motor is shut off the cutting knives will swing laterally and the blade will be out of balance. Not only will the motor run rough due to this unbalance but when it is again started there will be excessive and damaging vibrations in the machine until the blade reaches a speed when centrifugal force will move and maintain the blades in radial positions. However, with the spring washers 22, 23, 25 and 26 tightly engaging the bars 14 and 15 and forcing them into friction engagement with the knives, the knives will remain in proper outwardly extending balance when the motor is turned off.

Other means may be used to normally maintain the cutting knives in radial positions. In Figs. 4 and 5 I dispense with the spring washers and use a shear pin 28. This shear pin is of easily severable material and extends through the bars 14 and 15 and the cutting knife to be held in outward position. When this structure is used, whenever a pin is sheared a new one must be inserted to replace it. When a friction resilient means, such as the washers 22, 23, 25 and 26 are used, the cutting bar knives will automatically return to normal positions by centrifugal force.

By making the elongated knives 19 and 20 relatively long and the central portions 14 and 15 relatively short, I have reduced the possibility of the central portion of the plate unit striking an uncuttable object.

In the use of my cutting blade, I find that one of the reasons the motor does not stall in heavy weeds or grass is that the cutting knives will be retarded thereby and thus will cut a narrower strip resulting in less required motor power.

To insure successful securing of the cutting knives 19 and 20 against accidental detachment and to reduce wear, I have shown in Fig. 5 a hard metal sleeve 30 embracing the shaft of the rivet 24a and rotatably extending through the portions 14, 15, and the cutting knife. By this structure the rivet 24a does not carry the stresses of the unit blade but merely acts as a rivet means or clamp to hold the sleeve in proper position and the parts 14 and 15 toward each other in frictional engagement with the cutting knife. When such a structure is employed a safe blade unit is insured inasmuch as the sleeve 30 will bear all of the relative stress between the central portion of the blade and its cutting knives.

Some changes may be made in the construction and arrangement of my cutting blade for rotary type mowing machines without departing from the real spirit and purpose of my invention, and it is my intention to cover by my claims, any modified forms of structure or use of mechanical equivalents which may be reasonably included within their scope.

I claim:

1. In a cutting blade for lawn mowers, a central portion adapted to have its center area operatively secured to a prime mover, two elongated knife cutting bars pivoted to said central portion by bolt means at points diametrically opposite from each other on said central portion, and a friction washer on each of said bolt means for frictionally holding said knife cutting bars against independent movements relative to said central portion; said central portion comprising two spaced apart stub bars with said knife cutting bars having their rear end portions extending between them.

2. In a cutting blade for lawn mowers, a central portion adapted to have its center area operatively rigidly secured to a prime mover, two elongated knife cutting bars pivoted to said central portion by bolt means at points diametrically opposite from each other on said central portion, and a friction washer on each of said bolt means for frictionally holding said knife cutting bars against independent movements relative to said central portion; said central portion comprising two spaced apart stub bars with said knife cutting bars having their rear end portions extending between them.

3. A blade for a rotary type lawn mower comprising an elongated central portion having a central shaft attaching opening, end cutter portions pivotally attached to said central portion, said central portion comprising parallel spaced members and said end cutter portions being received between said spaced members, bolt means extending through said central and cutter portions, and at least one conical spring washer on each of said bolts in engagement with one of said central members, whereby said cutter portions are frictionally and pivotally connected to said central member.

References Cited in the file of this patent
UNITED STATES PATENTS

| | | |
|---|---|---|
| 1,868,918 | Schenk | July 26, 1932 |
| 2,281,639 | Swan | May 5, 1942 |
| 2,529,797 | Cauble | Nov. 14, 1950 |
| 2,529,870 | Golasky | Nov. 14, 1950 |
| 2,627,156 | Carter | Feb. 3, 1953 |
| 2,634,571 | Lawrence et al. | Apr. 14, 1953 |
| 2,651,530 | Blydenburgh | Sept. 8, 1953 |
| 2,654,986 | Gold | Oct. 13, 1953 |
| 2,669,084 | Warren | Feb. 16, 1954 |
| 2,716,323 | Ford | Aug. 30, 1955 |